(12) United States Patent
Yoshikawa et al.

(10) Patent No.: US 6,703,738 B2
(45) Date of Patent: Mar. 9, 2004

(54) OUTER ROTOR TYPE BRUSHLESS MOTOR

(75) Inventors: Rikio Yoshikawa, Numazu (JP);
Katsuhiro Mochizuki, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/990,125

(22) Filed: Nov. 21, 2001

(65) Prior Publication Data

US 2002/0063494 A1 May 30, 2002

(30) Foreign Application Priority Data

Nov. 29, 2000 (JP) ........................... 2000/363181
Jun. 12, 2001 (JP) ........................... 2001/176815

(51) Int. Cl.[7] ............................................. H02K 5/00
(52) U.S. Cl. ........................................ 310/91; 310/254
(58) Field of Search ..................... 310/50.5, 91, 67 R,
310/217, 254, DIG. 6; 290/38 R, 38 S; H02K 21/22

(56) References Cited

U.S. PATENT DOCUMENTS 5,363,003 A * 11/1994 Harada et al. ............. 310/67 R
5,508,578 A * 4/1996 Suzuki et al. ............... 310/218
5,910,693 A * 6/1999 Park .......................... 310/67 R

FOREIGN PATENT DOCUMENTS

| JP | 03-112334 | * 5/1991 | .......... H02K/5/167 |
| JP | 08-322222 | 12/1996 | |
| JP | 2000-324748 | * 11/2000 | |

* cited by examiner

Primary Examiner—Thomas M. Dougherty
Assistant Examiner—Nguyen N Hanh
(74) Attorney, Agent, or Firm—Pearne & Gordon LLP

(57) ABSTRACT

An outer rotor type brushless motor comprising an outer rotor having permanent magnets fixed onto an inner periphery of a rotor yoke, a stator including a stator core having a plural of magnetic pole portions protruded on an outer periphery thereof and coils wound on the magnetic pole portions, a cylindrical boss disposed on an inner periphery of an annular portion of the stator core, a rotational shaft extending along an axis of the boss and rotationally supported on the boss through a bearing with a leading end of the shaft having a center portion of the rotor yoke fixed thereto and a mounting plate fixed onto an outer periphery of the boss wherein the boss is formed of resin mold and extending through a hole in the mounting plate and fixed thereto and the annular portion of the stator core is mounted on and fixed to a rising portion on the inner periphery of the mounting plate.

11 Claims, 5 Drawing Sheets

OUTER ROTOR TYPE BRUSHLESS MOTOR

TECHNICAL FIELD OF THE INVENTION

This invention relates to an outer rotor type brushless motor having a rotor rotating outside of a stator.

BACKGROUND OF THE INVENTION

As shown in FIGS. 12, 13A, and 13B, an outer rotor type brushless motor of the prior art comprises an outer rotor 3 having a plural of permanent magnets 2 fixed onto an inner periphery of a cup-like metal rotor yoke 1, a stator 7 including a stator core 4 having a plural of magnetic pole portions 4a protruded on an outer periphery of an annular portion 4b and coils 6 wound on the magnetic pole portions 4a of the stator core 4 and faced to the permanent magnets 2 of the outer rotor 3, respectively, with coil insulation layers 5 provided between the magnetic pole portions 4a and the coils 6, respectively, a cylindrical metal boss 8' disposed on an inner periphery of the annular portion 4b of the stator core 4, a rotational shaft 10 extending along an axis of the boss 8' and rotationally supported on the boss 8 by a bearing 9 with a leading end of the shaft 10 having a center portion of the rotor yoke 1 fixed thereto, a metal mounting plate 11 fixed onto an outer periphery of the boss 8' for attaching the stator 7 on a support body not shown and a circuit board 13 fixed to the mounting plate 11 by screws 12 and having a drive circuit mounted thereon. The annular portions 4b of the stator core 4 are fixed to the outer periphery of the boss 8' by screws 14. The mounting plate 11 is fixed to the boss 8' by a pressurization enlarged portion 8'ak formed by deforming an annular base 8'a of the boss 8' so as to enlarge the diameter thereof after the mounting plate 11 engages the annular base 8'a extending through a hole 15 in the mounting plate 11.

However, since this prior outer rotor type brushless motor has the stator 7 fixed to the boss 8', which is in turn fixed to the mounting plate 11, the heat of the stator 7 radiates through the metal boss 8' from the mounting plate 11. Thus, there is a problem that the heat radiation efficiency is poor because of the boss 8' provided between the stator 7 and the mounting plate 11.

Furthermore, since the outer rotor type brushless motor has the stator core 4 fixed to the boss 8' by the screws 14 which extend through the annular portion 4b of the stator core 4, there tends to be a gap formed between the annular portion 4b of the stator core 4 and the boss 8'. Thus, there is another problem that it is hard to get the accuracy of assembly after the stator core 4 is fixed to the boss 8'.

Since the step of forming the boss 8' is performed separately from the step of forming the coil insulation layers 5 on the magnetic pole portions 4a of the stator core 4, much trouble is taken for manufacturing the motor, which disadvantageously causes the cost for manufacture to be higher.

SUMMARY OF THE INVENTION

Accordingly, it is an object of the invention to provide an outer rotor type brushless motor adapted to improve the heat radiation characteristic of a stator.

It is another object of the invention to provide an outer rotor brushless motor adapted to be easily assembled while the heat radiation characteristic is improved.

It is further object of the invention to provide an outer rotor type brushless motor adapted to improve the accuracy with which a stator is assembled to a boss while the heat radiation characteristic of the stator is improved.

It is further object of the invention to provide an outer rotor type brushless motor adapted to reduce the cost of manufacture while the accuracy with which a stator is assembled to a boss as well as the heat radiation characteristic of a stator are improved.

The invention is applied to an outer rotor type brushless motor comprising an outer rotor having permanent magnets fixed onto an inner periphery of a cup-like rotor yoke, a stator including a stator core having a plural of magnetic pole portions protruded on an outer periphery of an annular portion of the stator core and faced to the permanent magnets and coils wound on the magnetic pole portions, respectively, a cylindrical boss disposed on an inner periphery of the annular portion of the stator core, a rotational shaft extending along an axis of the boss and rotationally supported on the boss by a bearing with a leading end of the shaft having a center portion of the rotor yoke fixed thereto and a mounting plate fixed onto an outer periphery of the boss.

In the invention, the boss is formed of resin mold and extends through a hole in the mounting plate and fixed thereto. The annular portion of the stator core is fixed to a rising portion of the inner periphery of the mounting plate.

As the annular portion of the stator core is fixed directly to the mounting plate, the heat radiation characteristic of the stator can be improved. As the annular portion of the stator is fixed to the rising portion of the mounting plate, the stator can be fixed without any obstacle such as the coils because of the presence of the rising portion even though the stator is fixed directly to the mounting plate.

In a preferred mode of the invention, the boss may be formed of resin mold, the annular portion of the stator core is molded in and fixed to the outer periphery of the boss and also fixed to the rising portion of the inner periphery of the mounting plate.

As the annular portion of the stator core is fixed directly to the mounting plate, the heat radiation characteristic of the stator can be improved. Also, as the stator core is fixed to the rising portion of the mounting plate, the stator can be fixed without any obstacle such as the coils because of the presence of the rising portion even though the stator is fixed directly to the mounting plate. Furthermore, as the annular portion of the stator core is molded in and fixed to the outer periphery of the boss, there is no gap between the annular portion of the stator core and the boss while the relative position of them is fixed, which improves the accuracy with which the stator is assembled with the boss.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF PREFERRED EMBODIMENTS

Some embodiments of the invention will be described with reference to the drawings below.

Figure 1:
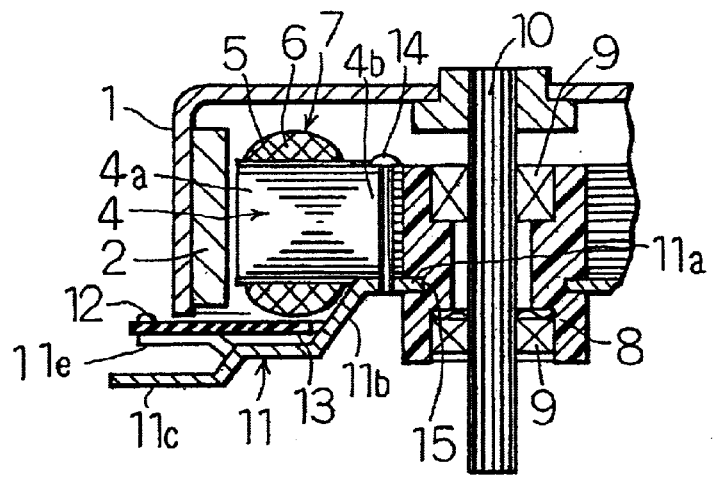
FIG. 1 is a longitudinally sectional view of an outer rotor type brushless motor constructed in accordance with a first embodiment of the invention.
Figure 2:
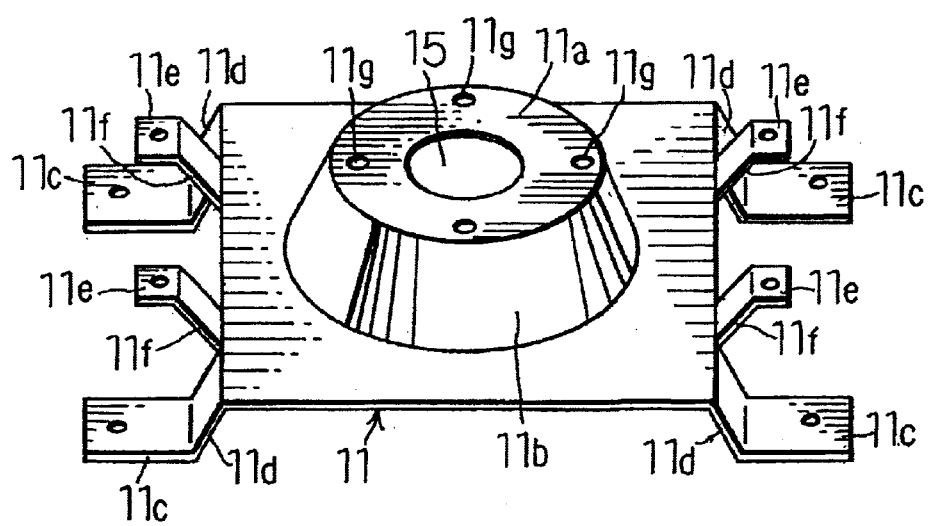
FIG. 2 is a perspective view of a mounting plate used in the first embodiment.

FIGS. 1 and 2 show a first embodiment of an outer rotor type brushless motor of the invention. FIG. 1 is a longitudinally sectional view of the outer rotor type brushless motor while FIG. 2 is a perspective view of a mounting plate used in the first embodiment.

In the outer rotor type brushless motor of the first embodiment, a boss 8 is formed of resin mold product. The boss 8 formed of the resin mold product is molded onto an edge of an inner peripheral portion 11a of a metal mounting plate 11 having a hole 15 provided therein at the center thereof.

Figure 12:
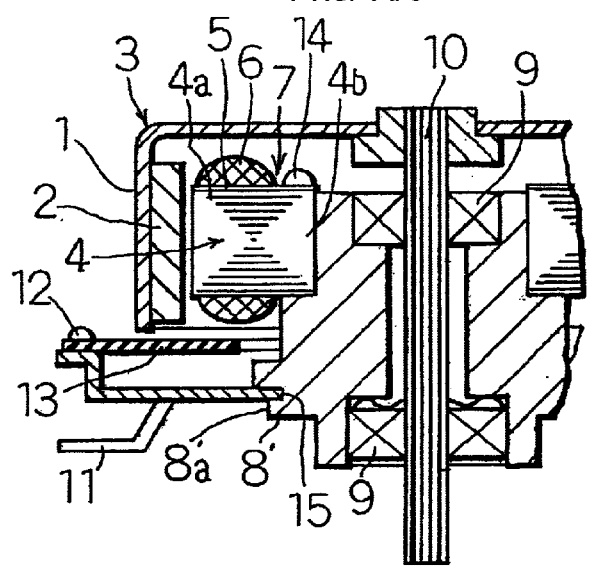
FIG. 12 is a longitudinally sectional view of a gist of an outer rotor type brushless motor constructed in accordance with a prior art.
Figure 13A:
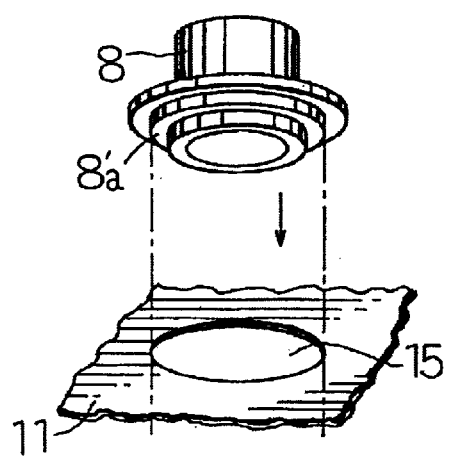
FIGS. 13A and 13B illustrate the steps of fixing a boss to a mounting plate with the construction of FIG. 12.
Figure 13B:
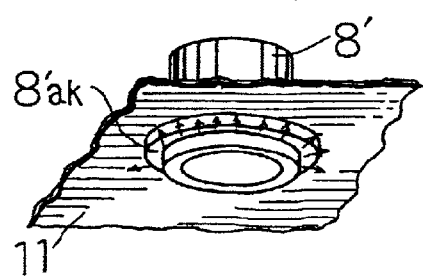

The mounting plate 11 has a square configuration and an annular rising portion 11b protruded at a center thereof. At the top of the rising portion 11b, there is provided the inner peripheral portion 11a having the hole 15 provided at a center thereof. At four corners of the square mounting plate 11, mount legs 11c are provided, which are connected by falling portions 11d to the mounting plate 11, respectively and fixed to a case of an internal combustion engine, for example. Adjacent to the falling portions 11d and, at the four corners of the square mounting plate 11, board holders 11e are provided, which are connected by rising portions 11f to the mounting plate 11. A plural of threaded holes 11g are provided in the inner peripheral portion 11a in a manner spaced in a circumferential direction. The annular portion 4b of the stator core 4 is mounted on the inner peripheral portion 11a of the mounting plate 11 and fixed by screws 14 thereto. Each of the screws 14 is threaded into the holes 11g in the inner peripheral portion 11a, respectively. The outer rotor type brushless motor of the first embodiment is constructed in a manner identical to that of FIG. 12 except to the aforementioned construction.

With the outer rotor type brushless motor constructed as aforementioned, since the annular portion 4b of the stator core 4 is fixed directly to the mounting plate 11, the heat radiation characteristic of the stator can be improved. Since the annular portion 4b of the stator 4 is fixed to the top of the rising portion 11b provided on the mounting plate 11, the stator core 4 can be fixed to the mounting plate 11 without any obstacle such as the coils 6 because of the presence of the rising portion 11b even though the stator core 4 is fixed directly to the mounting plate 11. Furthermore, since the boss 8 is molded together with and fixed to the edge of the inner peripheral portion 11a of the mounting plate 11 having the hole 15 provided at the center thereof, the boss 8 can be integrally provided with the mounting plate 11 by the forming step of the boss 8. This enables the number of the steps of assembly to be reduced and therefore the cost of manufacture to be reduced.

In this embodiment, since the annular portion 4b of the stator core 4 is mounted on the annular inner peripheral portion 11a of the mounting plate 11, the stator core 4 can be fixed more stably to the mounting plate 11.

Figure 3:
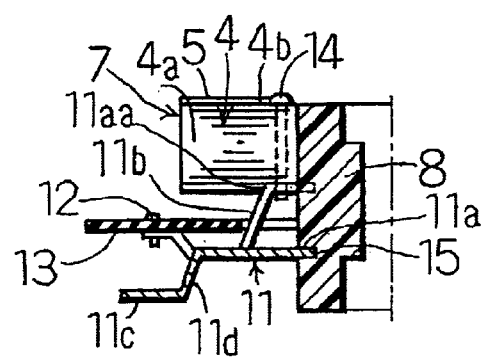
FIG. 3 is a longitudinally sectional view of an outer rotor type brushless motor constructed in accordance with a second embodiment of the invention.
Figure 4:
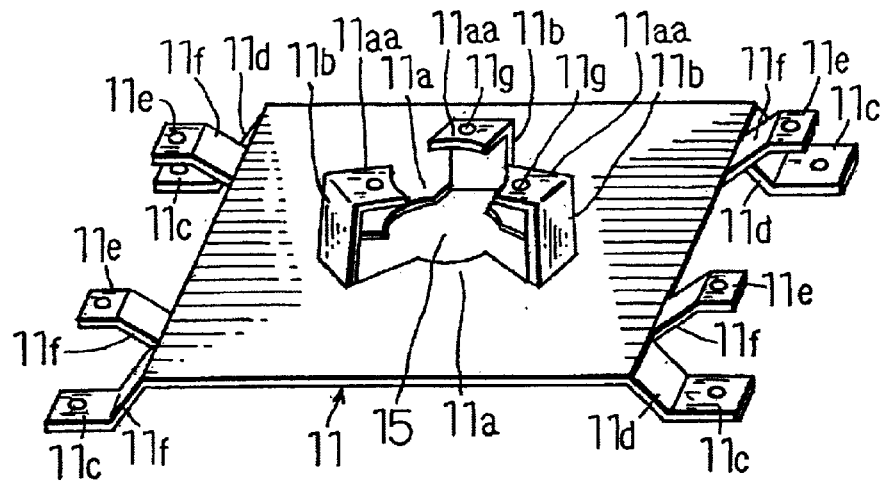
FIG. 4 is a perspective view of a mounting plate used in the second embodiment.

FIGS. 3 and 4 show the second embodiment of the outer rotor type brushless motor of the invention. FIG. 3 is a longitudinally sectional view of one half of the outer rotor type brushless motor according to the second embodiment while FIG. 4 is a perspective view of a mounting plate used in the second embodiment.

In the outer rotor type brushless motor, the hole 15 is provided in the mounting plate 11 at a center thereof and a plural of rising portions 11b (three rising portions in the illustrated embodiment) are provided in a manner spaced in the circumferential direction so as to raise up the inner peripheral portion 11a around the hole 15. Tops of the rising portions form core supports 11aa having a face parallel to the inner peripheral portion 11a. Thus, the inner peripheral portion 11a is made intermittent by rising up of the rising portions 11b. The screw holes 11g are provided in the core supports 11aa, respectively. The boss 8 is molded together with both of the inner peripheral portion 11a and the core supports 11aa so as to fix the mounting plate 11 to the boss 8. Although not shown in FIG. 4, the annular portion 4b of the stator core 4 is mounted on the core supports 11aa in the same manner as shown in FIG. 1 and fixed thereto by the screws 14. The outer rotor type brushless motor of FIGS. 3 and 4 is constructed in a manner identical to that of FIG. 1 except to the aforementioned construction.

The outer rotor type brushless motor of FIGS. 3 and 4 can have the same effect as the first embodiment. In this embodiment, since the mounting plate 11 is fixed to the boss 8 at the two places of the inner peripheral portions 11a and the core supports 11aa, the mounting plate can be fixed with a stable posture.

In the second embodiment, the boss 8 may be molded together with only one of the inner peripheral portions 11a and the core supports 11aa so as to fix the mounting plate 11 to the boss 8. In this case, the other may engage the outer periphery of the boss 8 or be inserted into a groove in the outer periphery of the boss 8.

Figure 5:
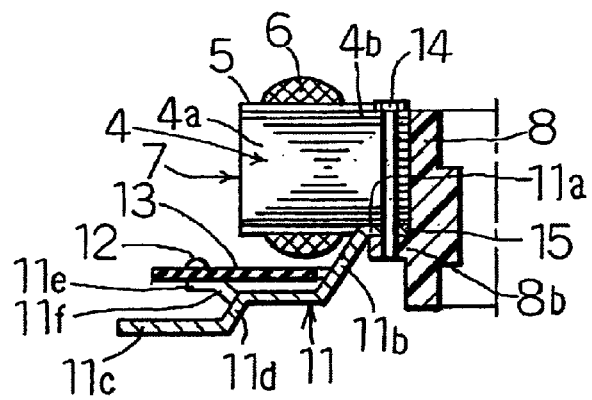
FIG. 5 is a longitudinally sectional view of one half of a stator of an outer rotor type brushless motor constructed in accordance with a third embodiment of the invention.

FIG. 5 is a longitudinally sectional view of one half of the outer rotor type brushless motor according to the third embodiment of the invention.

In the third embodiment, although the mounting plate 11 is fixed to the boss 8 at one place thereof in the same manner as shown in FIG. 1, the boss 8 is provided with a flange 8b, which is integrally formed when the boss 8 is molded. The inner peripheral portion 11a of the mounting plate 11 is mounted on the flange 8b and the annular portion 4b of the stator core 4 is mounted on the inner peripheral portion 11a of the mounting plate 11. The screws 14 extend through the inner peripheral portion 11a of the mounting plate 11 and the annular portion 4b of the stator core 4 and are threaded into and tightened to the flange 8b of the boss 8. The outer rotor type brushless motor of FIG. 5 is constructed in a manner identical to that of FIG. 1 except to the aforementioned construction.

With the motor constructed in this manner, the three parts of the stator core 4, the boss 8 and the mounting plate 11 can be integrally tightened by the screws 14. Thus, it will be noted that the steps of assembling the outer rotor type brushless motor can be reduced and therefore the cost can be reduced as well. The other effect of the first embodiment can be accomplished also by the third embodiment.

In the third embodiment, the screws 14 may be threaded into nuts integrally inserted into the flange 8b when the boss 8 is molded. Otherwise, the screws 14 may extend through the flange 8b and be tightened by nuts on the opposite side.

Figure 6:
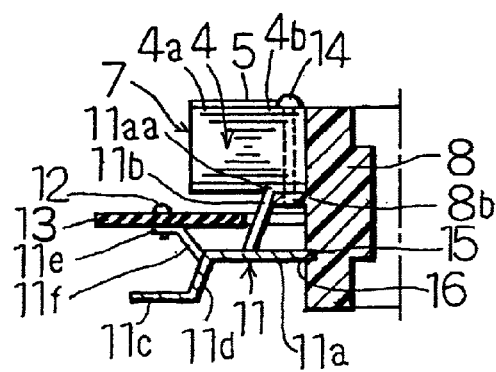
FIG. 6 is a longitudinally sectional view of one half of a stator of an outer rotor type brushless motor constructed in accordance with a fourth embodiment of the invention.

FIG. 6 is a longitudinally sectional view of one half of the outer rotor type brushless motor according to the fourth embodiment of the invention.

In the fourth embodiment, the mounting plate 11 has the inner peripheral portion 11a and the core supports 11aa in the same manner as shown in FIG. 3. Thus, the hole 15 is provided in the mounting plate 11 at its center and the three rising portions 11b are intermittently provided by raising up the inner peripheral portion 11a around the hole 15 in a manner spaced in a circumferential direction so as to form the core supports 11aa having the face parallel to the inner peripheral portion 11a. The threaded holes 11g are provided in the core supports 11aa. The boss 8 has the intermittent flanges 8b integrally formed corresponding to the core supports 11aa when the boss 8 is molded and has the groove 16 provided in the boss 8 at places corresponding to the intermittent inner peripheral portions 11a. The core supports 11aa of the mounting plate 11 are mounted on the flanges 8b of the boss 8, respectively, in such a manner as the intermittent inner peripheral portion 11a is inserted into the groove 16 by passing them through the spaces between the adjacent flanges 8b while being bended. Thereafter, the annular portion 4b of the stator core 4 is mounted on the core supports 11aa and the screws 14 extend through the stator cores 4 and the core supports 11aa and threaded into and tightened to the flanges 8b. The outer rotor type brushless motor of FIG. 6 is constructed in a manner identical to that of FIG. 1 except to the aforementioned construction.

With the motor constructed in this manner, the three parts of the stator core 4, the boss 8 and the mounting plate 11 can be integrally tightened by the screws 14 as well. Thus, it will be noted that the steps of assembling the outer rotor type brushless motor can be reduced and therefore the cost can be reduced. Furthermore, since the annular portion 4b of the stator core 4 is fixed directly to the mounting plate 11, the heat radiation characteristic of the stator 7 can be improved. Since the annular portion 4b of the stator 4 is fixed to the core supports 11aa at the top of the rising portions 11b provided on the mounting plate 11, the stator cores 4 can be fixed to the mounting plate 11 without any obstacle such as the coils 6 because of the presence of the rising portions 11b even though the stator core 4 is fixed directly to the mounting plate 11.

In the fourth embodiment, the screws 14 may be threaded into nuts integrally inserted into the flange 8b when the boss 8 is molded. Otherwise, the screws 14 may extend through the flange 8b and be tightened by nuts on the opposite side.

Furthermore, the intermittent inner peripheral portion 11a may be supported by contacting the outer periphery of the boss 8 instead of the insertion into the groove 16 in the boss 8.

Figure 7:
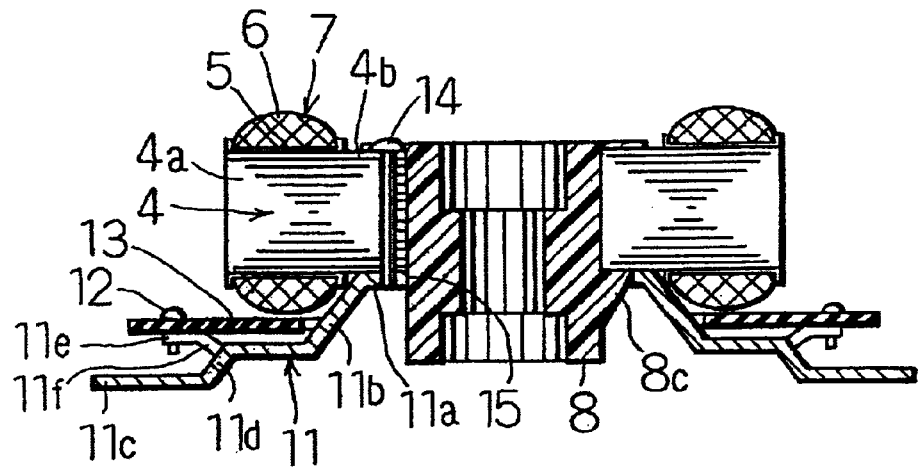
FIG. 7 is a longitudinally sectional view of one half of a stator of an outer rotor type brushless motor constructed in accordance with a fifth embodiment of the invention.
Figure 8:
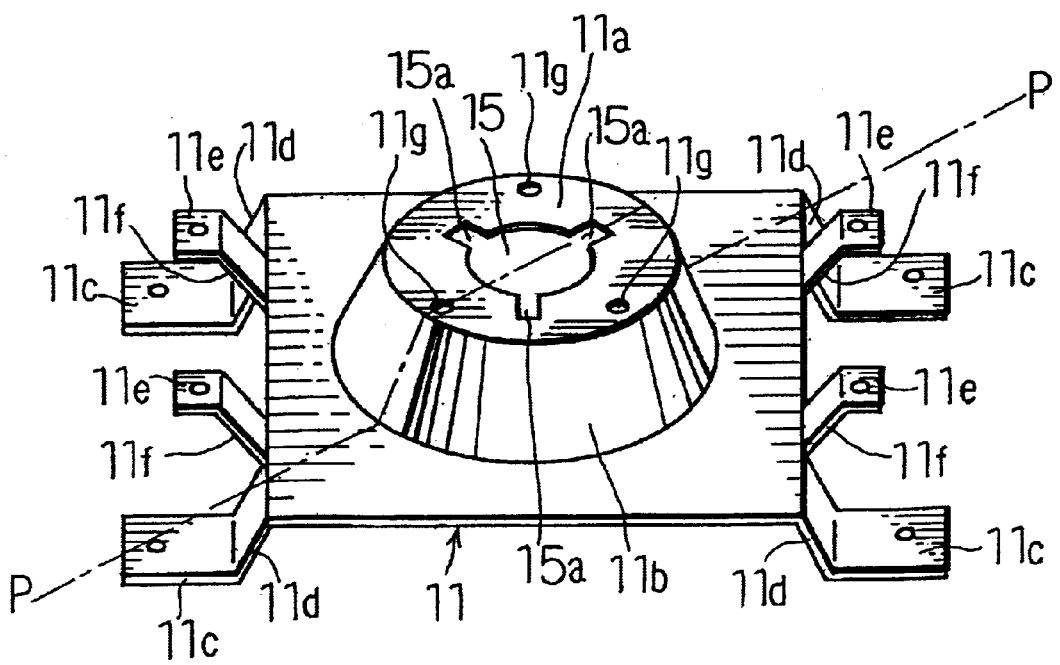
FIG. 8 is a perspective view of a mounting plate used in the fifth embodiment.
Figure 9:
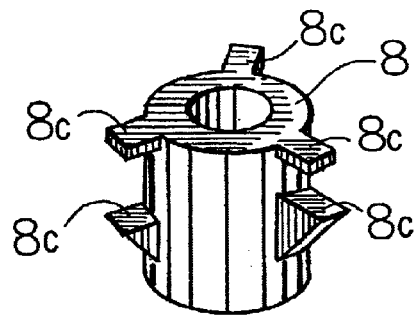
FIG. 9 is a perspective view of a boss formed in the fifth embodiment.

FIGS. 7 though 9 show a fifth embodiment of the outer rotor type brushless motor of the invention. FIG. 7 is a longitudinally sectional view of the stator of the outer rotor type brushless motor constructed in accordance with the fifth embodiment of the invention, FIG. 8 is a perspective view of the mounting plate used in the fifth embodiment and FIG. 9 is a perspective view of only the molded boss. FIG. 7 is a longitudinally sectional view of the mounting plate taken along the line P—P of FIG. 8.

In the outer rotor type brushless motor of the fifth embodiment, the boss 8 is formed of resin mold. The boss 8 having ribs 8c integrally protruded from the outer periphery thereof at intervals of 120 degree is molded together with the annular portion 4b of the stator core 4 at its inner edge so as to fix the annular portion 4b of the stator core 4 to the ribs 8c. In other words, the inner periphery of the annular portion 4b of the stator core 4 is inserted into and supported by the ribs 8c on the outer periphery of the boss 8 at the intervals of 120 degree. The coil insulation layers 5 provided on the magnetic pole portions 4a of the stator core 4 may be formed of resin mold. The boss 8 and the coil insulation layers 5 may be simultaneously formed by integral mold. To the stator core 4 having the coils 6 wound on the coil insulation layers 5, a circuit board 13 is fixed by fixation means not shown. Although not shown, the terminal ends of the coils 6 are electrically and physically connected to the circuit board 13. The inner periphery 11a of the metal mounting plate 11 fitted onto the boss 8 is fixed to the annular portion 4b of the stator core 4 by the screws 14.

The mounting plate 11 has a square configuration and the annular rising portion 11b is raised at the center thereof. At the top of the rising portion 11b, there is provided the inner peripheral portion 11a having the hole 15 coaxially provided at the center thereof. A plural of radial slots 15a are provided in the inner peripheral portion 11a around the hole 15. The ribs 8c of the boss 8 into which the annular portion 4b of the stator core 4 is inserted so as to be fixed thereto are fitted into the slots 15a of the mounting plate 11, respectively. At the four corners of the square mounting plate 11, the mount legs 11c are provided, which are connected by the falling portions 11d to the mounting plate 11, respectively and fixed to various apparatuses. Adjacent to the falling portions 11d and at the four corners of the square mounting plate 11 the board holders 11e are provided, which are connected by the rising portions 11f to the mounting plate 11. The circuit board 13 is fixed to the board holders 11e by the screws 12. The threaded holes 11g are provided in the inner peripheral portion 11a at intervals in the circumferential direction. The annular portion 4b of the stator core 4 is mounted on the inner peripheral portion 11a of the mounting plate 11 and fixed thereto by the screws 14, which are threaded into the holes 11g, respectively. The outer rotor type brushless motor of the fifth embodiment is constructed in the manner identical to that of FIG. 1 except to the aforementioned construction.

When the outer rotor type brushless motor of this embodiment is produced, molding the boss 8 within the annular portion 4b of the stator core 4, inserting the annular portion 4b into the boss 8 so as to support the former on the latter and molding the coil insulation layers 5 on the outer periphery of the magnetic pole portions 4a are carried out at the same time. Thereafter, the coils 6 are wound on the coil insulation layers 5 of the magnetic pole portions 4a. Then, the circuit board 13 is attached to the stator core 4, the boss 8 is fitted into the inner peripheral portion 11a of the mounting plate 11 and finally the inner peripheral portion 11a of the mounting plate 11 is fixed to the annular portion 4b of the stator core 4 by the screws 14.

Since, in the outer rotor type brushless motor of this embodiment, the annular portion 4b of the stator core 4 is inserted into the outer periphery of the boss 8 so as to be fixed thereto, there is no gap between the annular portion 4b of the stator core 4 and the boss 8 while the relative position of them is fixed, which improves the accuracy with which the stator 7 is assembled with the boss 8.

With the coil insulation layers 5 of the stator core 4 formed of resin mold as well, the coil insulation layers 5 can be easily formed. In addition thereto, with the boss 8 and the coil insulation layers 5 integrally formed, they may be formed at the same time, which allows the cost of manufacture to be reduced.

With the hole 15 provided at the center of the inner peripheral portion 11a at the top of the rising portion 11b and a plural of slots 15a radially provided around the hole 15, the ribs 8c of the boss 8 can be fitted into the slots 15a, respectively when the boss 8 is fitted into the hole 15 in the inner peripheral portion 11a of the mounting plate 11 so as to fix the inner peripheral portion 11a to the annular portion 4b of the stator core 4. This allows the mounting plate 11 to be fixed to the stator core 4 without any trouble. With the annular portion 4b of the stator core 4 fixed directly to the mounting plate 11, the heat radiation characteristic of the stator 7 can be improved.

Figure 10:
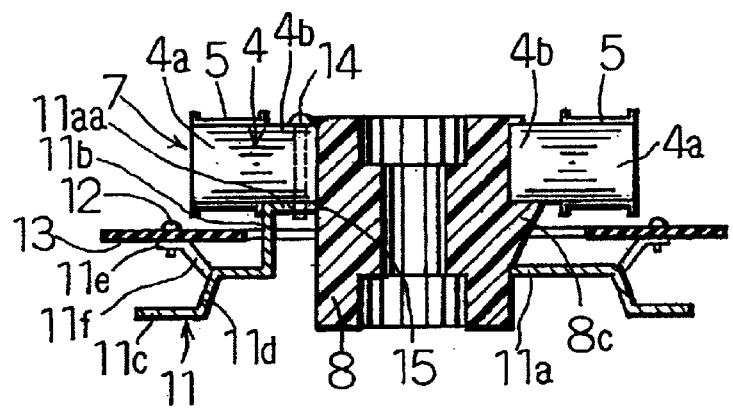
FIG. 10 is a longitudinally sectional view of a stator of an outer rotor type brushless motor constructed in accordance with a sixth embodiment of the invention.
Figure 11:
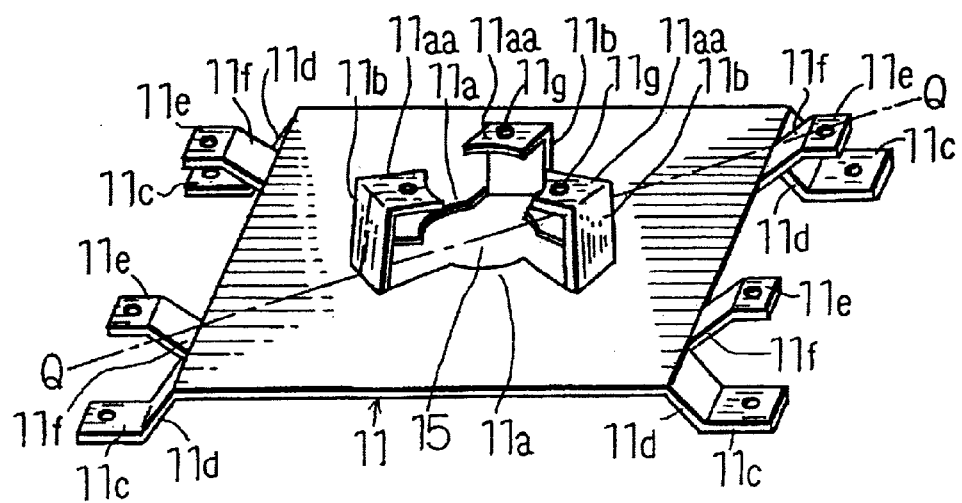
FIG. 11 is a perspective view of a mounting plate used in the sixth embodiment.

FIGS. 10 and 11 show the sixth embodiment of the outer rotor type brushless motor of the invention. FIG. 10 is a longitudinally sectional view of the stator of the outer rotor type brushless motor constructed in accordance with the sixth embodiment of the invention and FIG. 11 is a perspective view of the mounting plate used in the sixth embodiment. FIG. 10 is a longitudinally sectional view of the mounting plate taken along the line Q—Q of FIG. 11.

In the outer rotor type brushless motor of the sixth embodiment, the inner periphery of the annular portion 4b of the stator core 4 is integrally and securely inserted into the boss 8 at its ribs 8c provided at intervals of 120 degree when the boss 8 is molded. The coil insulation layers 5 on the magnetic pole portions 4a of the stator core 4 is formed of resin mold, which is formed at the same time when the boss 8 is molded. To the stator core 4 having the coils 6 wound on the coil insulation layers 5 is fixed the circuit board 13 by the fixing means not shown. Although not shown, the terminal ends of the coils 6 are electrically and physically connected to the circuit board 13.

The hole 15 is provided in the mounting plate 11 at the center thereof and a plural of rising portions 11b (three rising portions in the illustrated embodiment) are intermittently provided at intervals in the circumferential direction by raising up the inner peripheral portion 11a around the hole 15. The tops of the rising portions 11b form the core supports 11aa having the face parallel to the inner peripheral portion 11a. Thus, the inner peripheral portion 11a is made intermittent by rising up of the rising portions 11b. The threaded holes 11g are provided in the core supports 11aa, respectively. The boss 8 is fitted into the hole 15 of the mounting plate 11 with the ribs 8c of the boss 8 positioned between the adjacent core supports 11aa. The annular portion 4b of the stator core 4 is mounted on the core supports 11aa at the tops of the respective rising portions 11b and fixed thereto by the screws 14 in the same manner as shown in FIG. 1. The outer rotor type brushless motor of the sixth embodiment is constructed in the manner identical to that of FIG. 1 except to the aforementioned construction.

When the outer rotor type brushless motor of this embodiment is produced, molding the boss 8 within the annular portion 4b of the stator core 4, inserting the annular portion 4b into the boss so as to support the annular portion 4a to the boss 8 and molding the coil insulation layers 5 on the outer periphery of the magnetic pole portions 4a are carried out at the same time. Thereafter, the coils 6 are wound on the coil insulation layers 5 on the magnetic pole portions 4a. Then, the circuit board 13 is attached to the stator core 4, the boss 8 is fitted into the inner peripheral portion 11a of the mounting plate 11 and finally the core supports 11aa at the tops of the rising portions 11b are fixed to the annular portion 4b of the stator core 4 by the screws 14.

The construction of this embodiment can obtain the same effect as the fifth embodiment. Since, in this embodiment, the core supports 11aa are provided at the tops of the rising portions 11b intermittently provided on the inner peripheral portion 11a of the mounting plate 11 in a manner spaced in the circumferential direction, the ribs 8c of the boss 8 are fitted into the spaces between the adjacent rising portions 11b when the boss 8 is fitted into the hole 15 of the mounting plate 11 and the core supports 11aa at the tops of the rising portions 11b are fixed to the annular portion 4b of the stator core 4. Thus, the mounting plate 11 can be fixed to the stator core 4 without any trouble.

The coil insulation layers 5 may not be formed together with the boss 8, but may be formed by the separate step.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, an annular rising portion being formed on the side of an inner peripheral portion of said mounting plate so as to form at the top of said rising portions a face parallel to the face of said inner peripheral portion, said annular rising portion being integrally inserted into said boss so as to be fixed thereto when said boss is molded and said annular portion of said stator core being mounted on and fixed directly to said face at the top of said rising portion by screw.

2. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, a hole being provided in said mounting plate at its center, a plural of rising portions being intermittently provided on an inner peripheral portion around said hole so as to form at the tops of said rising portions core supports having a face parallel to said inner peripheral portion, at least one of said inner peripheral portion and said core supports being integrally inserted into said boss so as to be fixed thereto when said boss is molded and said annular portion of said stator core being mounted on and fixed to said core supports.

3. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed or resin mold, a flange being protruded on the outer periphery of said boss, an annular rising portion being provided on the side of an inner periphery of said mounting plate, an annular peripheral portion provided at the top of said rising portion and having a face parallel to said mounting plate being mounted on said flange of said boss, said annular portion of said stator core being mounted directly on an inner peripheral portion at the top of said rising portion, and said annular portion of said stator core, said inner peripheral portion of said mounting plate and said flange of said boss being tightened by screws extending through them.

4. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, a hole being provided in said mounting plate at its center, a plural of rising portions being intermittently provided on an inner peripheral portion of said mounting plate around said hole so as to form at the tops of said rising portions core supports having a face parallel to said inner peripheral portion, said core supports being inserted into said boss so as to be fixed thereto when said boss is molded, said inner peripheral portion being supported on the outer periphery of said boss, said annular portion of said stator core being mounted on said core supports and said annular portion of said stator core, said core supports of said mounting plate and said flange of said boss being tightened by screws extending through them.

5. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, with coil insulation layers provided between said magnetic pole portions and said coils, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, said annular portion of said stator core being inserted into an outer periphery of said boss so as to be fixed thereto, said coil insulation layers of said stator core being formed of resin mold, said annular portion of said stator core being fixed directly to a rising portion provided on the inner periphery of said mounting plate and said boss and said coil insulation layers being integrally formed.

6. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, said annular portion of said stator core being inserted into an outer periphery of said boss so as to be fixed thereto when said boss is molded, said annular portion of said stator core being fixed to a rising portion provided on the inner periphery of said mounting plate, a hole being provided in said rising portion forming an inner peripheral portion at the top of said rising portion, a plural of radial slots being provided in said inner peripheral portion around said hole, said annular portion of said stator core being integrally inserted into said boss at ribs so as to be supported by said ribs of said boss at said slots of said mounting plate and said annular portion of said stator core being fixed to said inner peripheral portion of said mounting plate.

7. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, with coil insulation layers provided between said magnetic pole portions and said coils, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, said annular portion of said stator core being inserted into an outer periphery of said boss so as to be fixed thereto, said coil insulation layers of said stator core being formed of resin mold, said annular portion of said stator core being fixed to a rising portion provided on the inner periphery of said mounting plate, a hole being provided in said rising portion forming an inner peripheral portion at the top of said rising portion, a plural of radial slots being provided in said inner peripheral portion around said hole, said annular portion of said stator core being integrally inserted into said boss at ribs so as to be supported by said ribs of said boss at said slots of said mounting plate and said annular portion of said stator core being fixed to said inner peripheral portion of said mounting plate.

8. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, with coil insulation layers provided between said magnetic pole portions and said coils, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold, said annular portion of said stator core being inserted into an outer periphery of said boss so as to be fixed thereto, said coil insulation layers of said stator core being formed of resin mold, said annular portion of said stator core being fixed to a rising portion provided on the inner periphery of said mounting plate, said boss and said coil insulation layers being integrally formed, a hole being provided in said rising portion forming an inner peripheral portion at the top of said rising portion, a plural of radial slots being provided in said inner peripheral portion around said hole, said annular portion of said stator core being integrally inserted into said boss at ribs so as to be supported by said ribs of said boss at said slots of said mounting plate and said annular portion of said stator core being fixed to said inner peripheral portion of said mounting plate.

9. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold and having ribs integrally protruded from the outer periphery thereof, said annular portion of said stator core being inserted into an outer periphery of said boss so as to be fixed thereto when said boss is molded, said annular portion of said stator core being fixed to a rising portion provided on the inner periphery of said mounting plate, a hole being provided in said mounting plate, a plural of rising portions being intermittently provided on an inner peripheral portion around said hole in a circumferential direction, core supports being provided at the tops of said rising portions in parallel to said inner peripheral portion, said annular portion of said stator core being mounted on said core supports and said annular portion of said stator core being inserted into an outer periphery of said boss when said boss is molded so as to be supported by said ribs above said inner peripheral portion between adjacent rising portions.

10. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, with coil insulation layers provided between said magnetic pole portions and said coils, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold and having ribs integrally protruded from the outer periphery thereof, said annular portion of said stator core being inserted into an outer periphery of said boss so as to be fixed thereto, said coil insulation layers of said stator core being formed of resin mold, said annular portion of said stator core being fixed to a rising portion provided on the inner periphery of said mounting plate, a hole being provided in said mounting plate, a plural of rising portions being intermittently provided on an inner peripheral portion around said hole in a circumferential direction, core supports being provided at the tops of said rising portions in parallel to said inner peripheral portion, said annular portion of said stator core being mounted on said core supports and said annular portion of said stator core being inserted into an outer periphery of said boss when said boss is molded so as to be supported by said ribs above said inner peripheral portion between adjacent rising portions.

11. An outer rotor type brushless motor comprising an outer rotor having permanent magnets fixed onto an inner periphery of a cup-like rotor yoke, a stator including a stator core having a plural of magnetic pole portions protruded on an outer periphery of an annular portion of said stator core and faced to said permanent magnets and coils wound on said magnetic pole portions, respectively, with coil insulation layers provided between said magnetic pole portions and said coils, respectively, a cylindrical boss disposed on an inner periphery of said annular portion of said stator core, a rotational shaft extending along an axis of said boss and rotationally supported on said boss by a bearing with a leading end of said shaft having a center portion of said rotor yoke fixed thereto and a mounting plate fixed onto an outer periphery of said boss, said boss being formed of resin mold and having ribs integrally protruded from the outer periphery thereof, said annular portion of said stator core being inserted into an outer periphery of said boss so as to be fixed thereto, said coil insulation layers of said stator core being formed of resin mold, said annular portion of said stator core being fixed to a rising portion provided on the inner periphery of said mounting plate, said boss and said coil insulation layers being integrally formed, a hole being provided in said mounting plate, a plural of rising portions being intermittently provided on an inner peripheral portion around said hole in a circumferential direction, core supports being provided at the tops of said rising portions in parallel to said inner peripheral portion, said annular portion of said stator core being mounted on said core supports and said annular portion of said stator core being inserted into an outer periphery of said boss when said boss is molded so as to be supported by said ribs above said inner peripheral portion between adjacent rising portions.

* * * * *